Oct. 27, 1959 J. H. CARR 2,910,308
SNAP-IN LUG-IN-GROOVE TYPE RESILIENT CONDUIT JOINT
Filed April 10, 1956 2 Sheets-Sheet 1
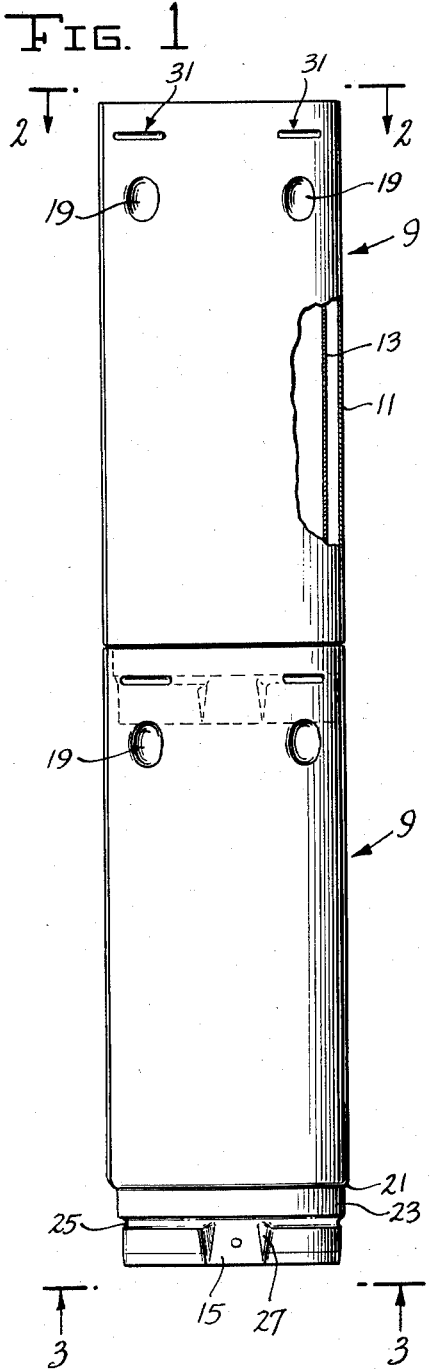
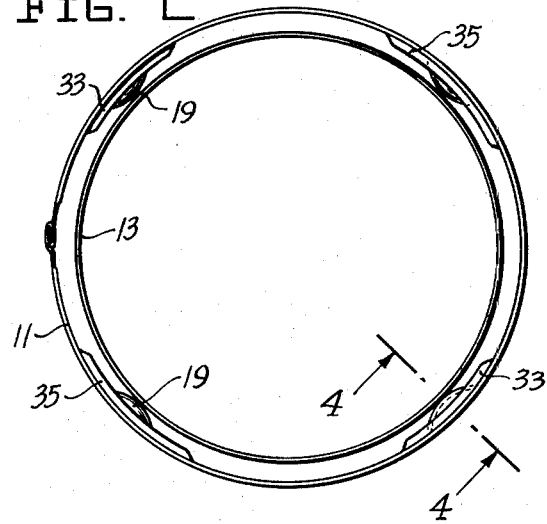
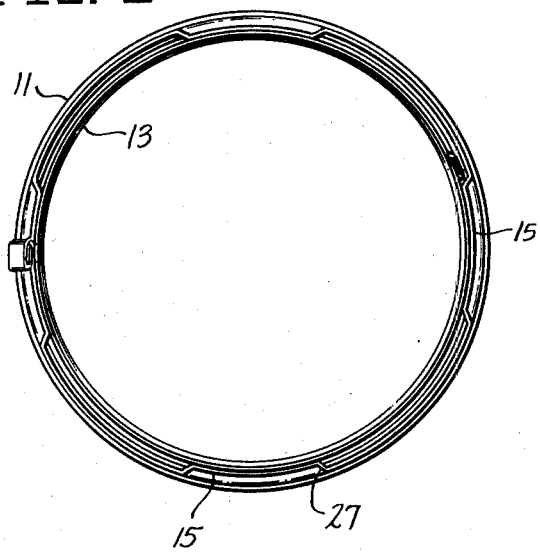
INVENTOR.
JOHN H. CARR
BY ECKHOFF & SLICK, Attys.
A member of the firm Oct. 27, 1959　　　　J. H. CARR　　　　2,910,308
SNAP-IN LUG-IN-GROOVE TYPE RESILIENT CONDUIT JOINT
Filed April 10, 1956　　　　　　　　　　　2 Sheets-Sheet 2
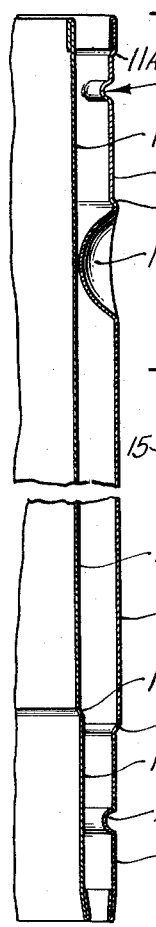
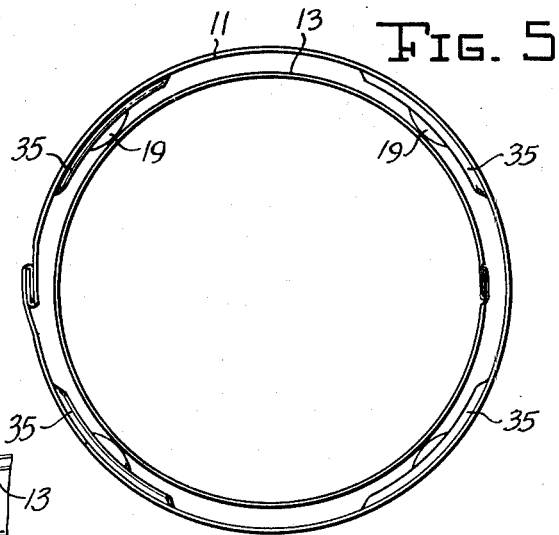
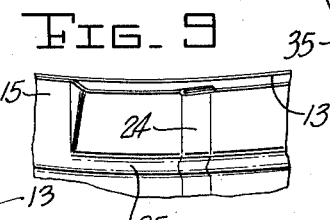
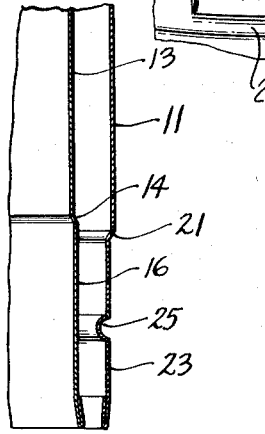
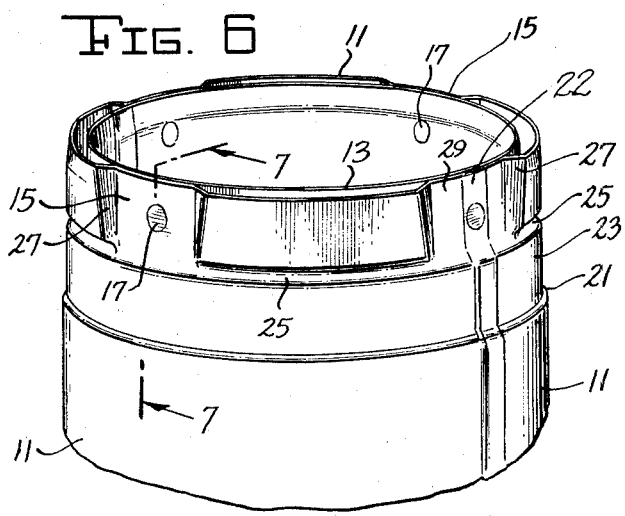
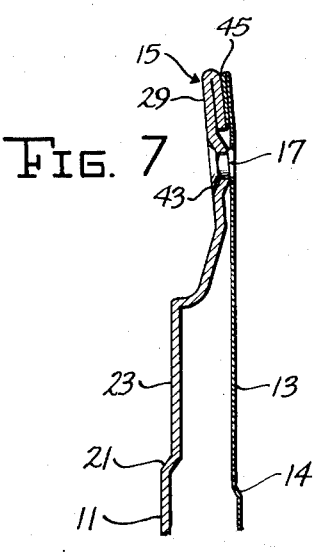
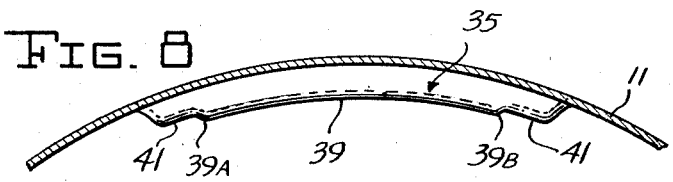
INVENTOR.
JOHN H. CARR
BY ECKHOFF & SLICK, Attys.
A member of the firm

United States Patent Office 2,910,308
Patented Oct. 27, 1959

2,910,308
SNAP-IN LUG-IN-GROOVE TYPE RESILIENT CONDUIT JOINT

John H. Carr, Redwood City, Calif., assignor to Dura-Vent Corporation, a corporation of Delaware Application April 10, 1956, Serial No. 577,370

6 Claims. (Cl. 285—27)

The present invention relates to an improved method of locking pipe sections together. The invention is primarily applicable to multiple walled vent pipes and will be particularly described in connection with a double walled vent pipe, although it must be understood that the invention is equally applicable to single wall pipes or to pipes having more than two walls.

In vent pipes, it is desirable to provide a positive means of locking adjacent sections of the pipe together. It is also desirable to provide means whereby the pipes may be pushed together and have some rigidity, to facilitate the installation of the pipes. It is further desirable to provide means whereby pipe sections may be dissembled in case there has been an error made in assembly.

In accordance with the present invention, means are provided for locking adjacent pipe sections together wherein the sections merely have to be pushed into each other to form a semi-locked, rigid structure for ease in erection. Additionally, by merely rotating one of the pipes relative to the other a fully locked position is achieved whereby the pipes have high structural rigidity.

In the drawings forming a part of this application:

Figure 1 is a plan view, partly in section, showing two sections of pipe joined together in accordance with the present invention.

Figure 2 is an end view of one of the pipe sections of Figure 1 on the lines 2—2 of Figure 1.

Figure 3 is a view of the opposite end of a pipe section on the lines 3—3 of Figure 1.

Figure 4 is a sectional view through a pipe on the lines 4—4 of Figure 2.

Figure 5 is an end view, similar to Figure 2, showing an alternate form of construction.

Figure 6 is a perspective view of an end of the pipe of the present invention.

Figure 7 is a sectional view on the lines 7—7 of Figure 6.

Figure 8 is an enlarged end view of a pipe, corresponding to one segment of Figure 2, showing an alternate form of construction of the grooves which are used to lock the pipes together.

Figure 9 is a perspective fragmentary view of a pipe end, similar to Figure 6.

Referring now to the drawings by reference characters, there is shown a pipe section generally designated 9 having an outer wall 11 and an inner wall 13. The inner wall is substantially cylindrical, as is shown. The outer pipe 11 has a series of indentations 15 at one end thereof, which will be described in more detail hereinafter, and the inner and outer pipes are held together at this end by means of a series of rivets, or spot wells 17. At the opposite end, the outer wall 11 contains a series of dimples 19, which serve to hold the walls concentric. These dimples form the subject matter of a separate application, and form no part of the present invention.

At one end of the pipe, a shoulder 21 is formed, leaving a reduced diameter portion of the pipe 23. The reduction in diameter of portion 23 is greater than the thickness of the pipe wall and is such that when two sections are interlocked, as is shown in Figure 1, the outer wall of the next adjacent section will rest against the shoulder 21 and the outside of the pipe will present a smooth, substantially continuous straight line. A circumferential groove 25 is provided at the end of the pipe and leading from the circumferential groove are a plurality, suitably four, indentations 15. The indentations 15 have tapering sidewalls 27 and the bottoms 29 of the indentations 15 are approximately parallel to the outer wall of the pipe 11, but are slightly tapered, as is shown in Figure 7.

At the opposite end of the pipe, a series of circumferential grooves, generally designated 31, are provided. It will be apparent that the circumferential grooves are located approximately the same distance from the end of the pipe as the width of the reduced diameter portion 23 of the opposite end of the pipe. In the embodiment shown in Figure 2, some of the grooves 31 are longer than the others. Thus, there are two short grooves 33 and two long grooves 35. The short grooves 33 are approximately the same width as the width of the indentations 15 at their narrowest point. In other words, the indentations 33 can freely slip down the grooves 15 without hindrance. The indentations 35 are approximately equal to or less than the widest point of the grooves 15, but are somewhat wider than the narrowest point of groove 15. Thus, some pressure is necessary, as well as some deformation of the pipe in order to push the indentations 35 over the grooves 15.

In this manner, a pipe is made having two different locking functions. In the first place, when the indentations 31 are lined up with the grooves 15 and the pipes merely pushed together, there must be some deformation of the metal and when the longer grooves 35 get to the circumferential groove 25, they will snap into the groove. In this position, the pipe is half locked and is sufficiently rigid to enable the builder to erect the pipe. However, if the pipe is given a slight turn, i.e., about 45° relative to the other pipe, then both the short and the long grooves lock into place, producing a fully locked pipe structure. The inner wall 13, preferably has an offset 14 therein, leaving a section of increased diameter 16. Thus, when two sections of pipe are placed together, one end of the adjacent inner wall abuts the offset 14, producing a smooth, continuous inner wall.

Although the structure thus far described is a preferred embodiment, numerous variations can be made. For instance, four grooves and four locking indentations have been described, but it is obvious that a smaller or a larger number could be used. Further, one can make all of the grooves long, as is shown in Figure 5, so that all of the grooves require some distortion to pass over the next adjacent section of pipe.

Still a further variation of the indentations is shown in enlarged form in Figure 8. In accordance with this embodiment, the indentation 35 is made in two different depths. Thus, there is a deep center portion 39 extending from the points 39A to 39B, and on either end thereof there are indentations 41 of lesser depth. If the pipe is made in accordance with this embodiment, the distance 39A to 39B is selected to correspond with the narrowest portion of the indentation 15. Thus, when pipes are locked embodying this embodiment, it is only necessary to force the small portion 41 over a next adjacent section of pipe since the section 39 goes within the indentation.

It was earlier stated that the inner and outer walls were fastened together by means of rivets 17. A preferred method of fastening the inner and outer walls is shown in the detailed view of Figure 7. In accordance with this method, a dimple 43 is first made in the outer wall at the point where the rivet 17 is to be inserted. By first making the dimple 43, the pipes are brought into better alignment and there is no tendency for the inner and outer pipes to spread, as at 45, as would be the case if these dimples were omitted.

Although the indentations 15 have been shown of equal size and spacing, it is obvious that they could be made in varying sizes or spacings. Similarly, the grooves 31 can be of varying lengths. It is important that at least one groove 31 be wider than its mating indentation 15.

The seam 22 of the pipe may be advantageously placed at the bottom of one of the indentations 15, as is shown in Figure 6. However, the seam 24 may be offset from the indentation 15, as is shown in Figure 9. However, it is preferable to not have the seam pass over one of the grooves 33, 35 or 39.

Another variation is shown at 11A, 11B and 11C in Figure 4. In accordance with this variation, a small offset is produced by reducing the diameter of the outer pipe as is shown at 11A and 11C, to produce an intermediate section, 11B, which is reduced in diameter by about the thickness of the hem at the end of the pipe. This is an advantageous structure inasmuch as when two sections of pipe are locked together, a long bearing surface, i.e., 11B, is provided rather than the relatively small bearing surface which would be provided if the pipe were not reduced in diameter at this point.

I claim:

1. A construction for a run of pipe comprising: two lengths of round pipe, a resilient first pipe end and one of said pipe lengths having a reduced diameter portion adjacent said pipe end; a continuous arcuate groove extending about the entire circumference of said reduced diameter portion and spaced from the end thereof; a series of indentations joined with and running from said arcuate groove to said pipe end, the maximum depth of said arcuate groove and the depth of the indentations being the same at their juncture lines, the portions of the pipe end located between said indentations having a diameter at the portion thereof which forms the outer wall of said arcuate groove substantially equal to the diameter of the edge of the pipe forming the inner wall of said arcuate groove, at least one of said indentations increasing in width as the end of said pipe is approached; a resilient second pipe end on the second of said pipe lengths for surrounding and mating with said first pipe end, said second end having a series of short, circumferential grooves therein corresponding in number and placement to the indentations on said first pipe end, the circumferential groove corresponding to the indentation of increasing width having a length greater than the width of its said corresponding indentation at the point where the said indentation is narrowest, all of said circumferential grooves being shorter than the width of the corresponding indentations on the said first pipe end at points where said first indentations are widest, said short circumferential grooves each being adapted to register with one of the said indentations adjacent the first pipe end whereby each indentation serves as a guide for the corresponding circumferential groove and, thereafter, as said pipe ends are forced into locking engagement, the circumferential groove having a length greater than the minimum width of its corresponding indentation is forced over the wall of the indentation as said circumferential groove strikes said area of minimum indentation width, whereby to allow the circumferential groove to pass that portion opposite said indentation of minimum width and to seat each of said circumferential grooves in said continuous arcuate groove to form a partially locked structure, said first and second pipe ends thereafter being capable of being fixedly locked together by counter-rotating the said pipe ends.

2. The structure of claim 1 having an inner, concentric pipe spaced from the outer pipe to provide a double-walled pipe, at least two of the indentations of the outer pipe extending down to and secured to the inner pipe.

3. The structure of claim 1 wherein at least one of said circumferential grooves on said second pipe end consists of a stepped groove wherein the center of said groove is deeper than is said groove at the ends thereof and wherein the center portion corresponds in length to the minimum width of the corresponding indentation at said first pipe end and wherein the total length of said groove is longer than the minimum width of said corresponding indentation on said first pipe end.

4. A construction for a run of pipe comprising: two lengths of resilient round pipe, each length having concentrically spaced walls including an inner wall and an exterior wall, the exterior wall of at least one of said pipe lengths having a reduced diameter portion adjacent a first end of said pipe length; a continuous arcuate groove extending about the entire circumference of said reduced diameter portion; a series of indentations in said pipe wall running from said arcuate groove to said pipe end, at least one of said indentations increasing in width as the end of said pipe wall is approached, said indentations being of sufficient depth to contact the upper surface of the interior pipe wall, said interior and exterior walls being fixedly secured together at points where said indentations of said exterior walls contact said interior walls; a second pipe end on the second of said pipe lengths for surrounding and mating with said first pipe end, the exterior wall of said second pipe end having a series of short, circumferential grooves therein corresponding in number and placement to the indentations at said first pipe end, the groove corresponding to the said indentation of increasing width having a length greater than the minimum width of said indentation, all of the said grooves being shorter than the width of the corresponding indentation of said first pipe end at points where said indentations are widest, said short circumferential grooves each being adapted to register with the said corresponding indentation adjacent said first pipe end, whereby each indentation serves as a guide for its corresponding groove, and thereafter, as said pipe ends are forced into locking engagement, the groove having a greater length than the minimum width of its corresponding indentation is forced over the wall of the indentation as said groove strikes said area of minimum indentation width, whereby to allow the circumferential groove to pass over that portion of said indentation which is of minimum width, and to seat each of said circumferential grooves in said continuous arcuate groove and form a partially locked structure, said first and second pipe ends thereafter being capable of being fixedly locked together by counter-rotating the said pipe ends.

5. The structure of claim 4 wherein four circumferential grooves are provided and four substantially identical indentations are provided, each of the indentations increasing in width as the end of the pipe is approached, two of the grooves being opposed and being of a greater width than the minimum width of the indentations, and the other two grooves being substantially equal in length to the minimum indentation width.

6. The structure of claim 5 wherein each of the two grooves having a greater width than the width of the indentations is a stepped groove wherein the center of said groove is deeper than is said grooves at the ends thereof and wherein the deep center portion corresponds in length to the minimum width of an indentation and wherein the total length of the grooves is greater than the minimum width of said indentations.

References Cited in the file of this patent

UNITED STATES PATENTS

| | | |
|---|---|---|
| 63,797 | Hurd | Apr. 16, 1867 |
| 266,017 | Cooper | Oct. 17, 1882 |
| 1,067,172 | Holub | July 8, 1913 |
| 1,279,935 | Sweat | Sept. 24, 1918 |
| 1,481,255 | Cumfer | Jan. 22, 1924 |
| 2,650,112 | Kinkead | Aug. 25, 1953 |
| 2,650,114 | Epstein | Aug. 25, 1953 |
| 2,712,950 | Siebert | July 12, 1955 |